United States Patent
Sugumaran

(10) Patent No.: US 9,561,871 B2
(45) Date of Patent: Feb. 7, 2017

(54) UAV DOCKING SYSTEM AND METHOD

(71) Applicant: Deere & Company, Moline, IL (US)

(72) Inventor: Ramanathan Sugumaran, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 547 days.

(21) Appl. No.: 14/272,125

(22) Filed: May 7, 2014

(65) Prior Publication Data

US 2016/0144982 A1    May 26, 2016

(51) Int. Cl.

| B64C 29/00 | (2006.01) |
|---|---|
| B64F 1/36 | (2006.01) |
| B64F 1/00 | (2006.01) |
| B64C 25/32 | (2006.01) |
| B64C 39/02 | (2006.01) |
| A01D 41/12 | (2006.01) |
| B64C 25/34 | (2006.01) |

(Continued)

(52) U.S. Cl.
CPC .............. *B64F 1/36* (2013.01); *A01D 41/12* (2013.01); *B64C 25/32* (2013.01); *B64C 25/34* (2013.01); *B64C 25/52* (2013.01); *B64C 39/024* (2013.01); *B64F 1/00* (2013.01); *B64F 1/005* (2013.01); *B64F 1/12* (2013.01); *B64C 2201/027* (2013.01); *B64C 2201/066* (2013.01); *B64C 2201/108* (2013.01); *B64C 2201/18* (2013.01); *B64C 2201/208* (2013.01)

(58) Field of Classification Search
CPC ........ B64C 25/00; B64C 25/001; B64C 25/32; B64C 25/34; B64C 25/52; B64C 29/0091; B64C 39/024; B64C 2025/325; B64C 2201/12; B64C 2201/18; B64C 2201/108; B64C 2201/208; B64F 1/12; B64F 1/36; B64F 1/005; B64F 3/00; B64F 2700/6203
See application file for complete search history.

(56) References Cited

U.S. PATENT DOCUMENTS

| 1,526,268 | A | * | 2/1925 | Dobie | ..................... | B64F 1/36 |
|---|---|---|---|---|---|---|
| | | | | | | 244/114 R |
| 3,149,803 | A | * | 9/1964 | Petrides | ............... | B64C 39/022 |
| | | | | | | 244/17.13 |

(Continued)

FOREIGN PATENT DOCUMENTS

IL    WO 2007141795 A1 * 12/2007   ........... B64C 39/022

OTHER PUBLICATIONS

Rezelj, Anže and Skočaj, Danijel. Autonomous landing on the mobile platform to automatically recharge the battery. University of Ljubljana Faculty of Computer and Information, 2013, Ljubljana, Slovenia. (Per 37 C.F.R. § 1.98 (a)(3)(i), this document has been cited based on the figures contained therein.).

(Continued)

*Primary Examiner* — Tien Dinh
*Assistant Examiner* — Michael A Fabula

(57) ABSTRACT

An aerial vehicle docking system includes a landing pad and an aerial vehicle. The landing pad has a concave landing surface and a depression. The aerial vehicle has landing gear and a protrusion. The protrusion is shaped to mate with the depression. The protrusion and the landing gear are positioned on a bottom surface of the aerial vehicle.

21 Claims, 8 Drawing Sheets

(51) Int. Cl.
*B64C 25/52* (2006.01)
*B64F 1/12* (2006.01)

(56) References Cited

U.S. PATENT DOCUMENTS

| | | | | |
|---|---|---|---|---|
| 3,217,097 | A * | 11/1965 | Pauli | B64C 39/022 174/47 |
| 3,241,145 | A * | 3/1966 | Petrides | B64C 39/022 244/17.11 |
| 4,272,042 | A * | 6/1981 | Slater | B64B 1/38 244/115 |
| 7,093,790 | B1 * | 8/2006 | Davidson | B64F 1/14 244/110 E |
| 7,210,654 | B1 | 5/2007 | Cox et al. | |
| 7,410,125 | B2 | 8/2008 | Steele | |
| 8,511,606 | B1 * | 8/2013 | Lutke | B64C 39/028 244/100 R |
| 8,899,903 | B1 * | 12/2014 | Saad | B65G 67/00 320/109 |
| 9,056,676 | B1 * | 6/2015 | Wang | B64F 1/00 |
| 9,139,310 | B1 * | 9/2015 | Wang | B64F 1/36 |
| 9,290,277 | B2 * | 3/2016 | You | B64F 1/18 |
| 2003/0130767 | A1 | 7/2003 | Carroll | |
| 2004/0167682 | A1 * | 8/2004 | Beck | B60K 17/356 701/3 |
| 2004/0264761 | A1 * | 12/2004 | Mas | G06K 9/00664 382/154 |
| 2004/0264762 | A1 * | 12/2004 | Mas | G06K 9/00664 382/154 |
| 2007/0228214 | A1 * | 10/2007 | Horak | A63H 27/14 244/63 |
| 2009/0236470 | A1 * | 9/2009 | Goossen | B64C 39/024 244/115 |
| 2011/0068224 | A1 * | 3/2011 | Kang | B64C 39/024 244/116 |
| 2012/0029732 | A1 * | 2/2012 | Meyer | A01B 69/008 701/2 |
| 2012/0091258 | A1 * | 4/2012 | Keidar | B64C 39/022 244/17.11 |
| 2012/0303179 | A1 * | 11/2012 | Schempf | B25J 11/002 701/2 |
| 2013/0081245 | A1 | 4/2013 | Vavrina et al. | |
| 2013/0233964 | A1 * | 9/2013 | Woodworth | B64C 37/02 244/2 |
| 2014/0236390 | A1 * | 8/2014 | Mohamadi | B64C 19/00 701/2 |
| 2014/0284423 | A1 * | 9/2014 | Utsch | B64F 1/22 244/110 E |
| 2014/0303814 | A1 * | 10/2014 | Burema | A01B 79/005 701/3 |
| 2015/0102154 | A1 * | 4/2015 | Duncan | B64C 39/022 244/2 |
| 2015/0120094 | A1 * | 4/2015 | Kimchi | B64C 39/024 701/3 |
| 2015/0266575 | A1 * | 9/2015 | Borko | B64C 39/024 701/3 |
| 2016/0001883 | A1 * | 1/2016 | Sanz | B64C 39/024 244/17.23 |
| 2016/0011592 | A1 * | 1/2016 | Zhang | B64F 1/362 701/2 |
| 2016/0039300 | A1 * | 2/2016 | Wang | B60L 11/1822 244/39 |
| 2016/0039541 | A1 * | 2/2016 | Beardsley | B60L 11/1816 701/2 |
| 2016/0068277 | A1 * | 3/2016 | Manitta | B64C 39/024 244/114 R |

OTHER PUBLICATIONS

Coilmaster Series Steel Mill Magnets. Product overview [online]. Walker Magnetics, 2015 [retrieved on Aug. 1, 2016]. Retrieved from the Internet: <URL:http://www.walkermagnet.com/lifting-magnets-steel-mill-magnets-coilmaster-series.htm>.

* cited by examiner

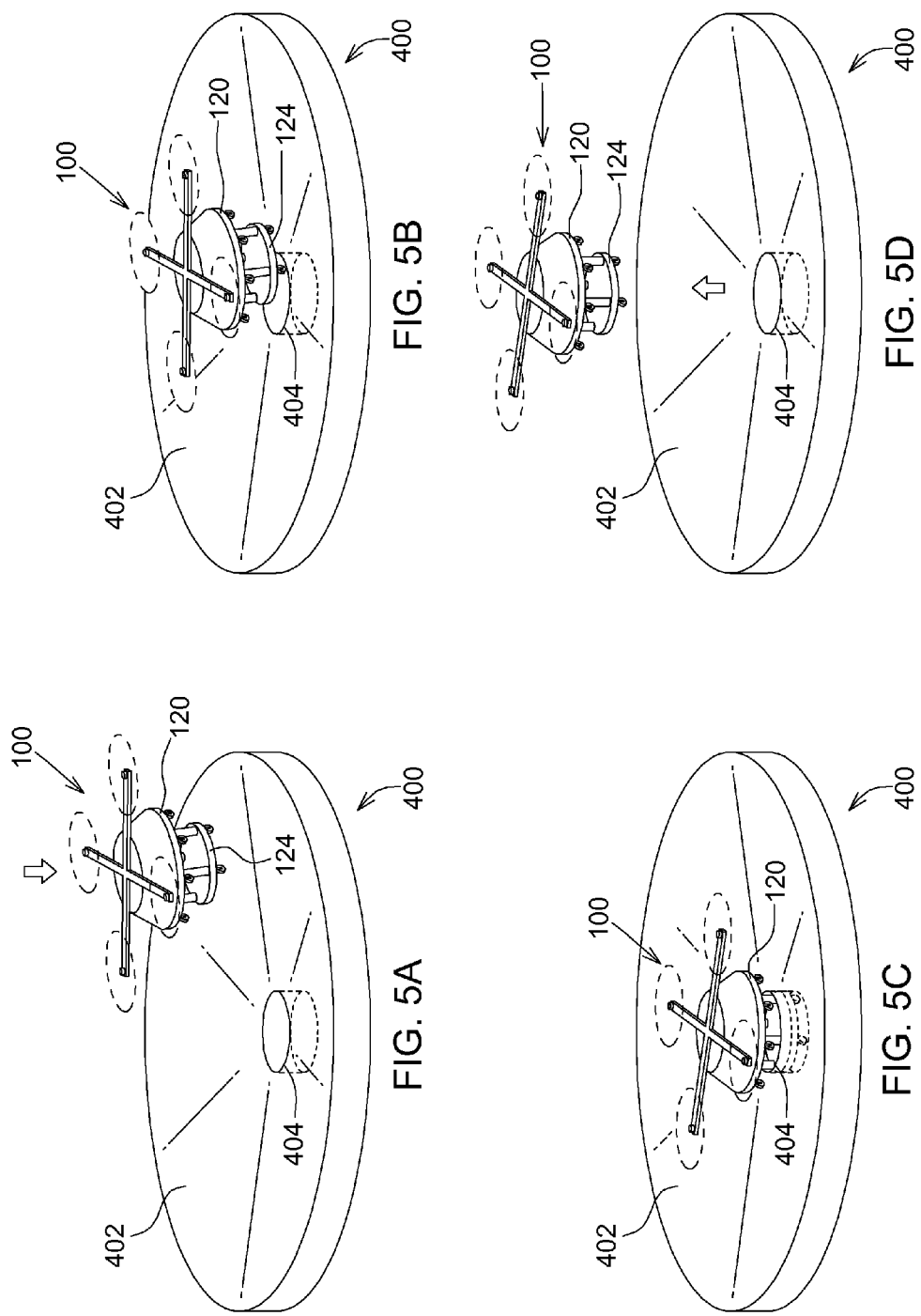

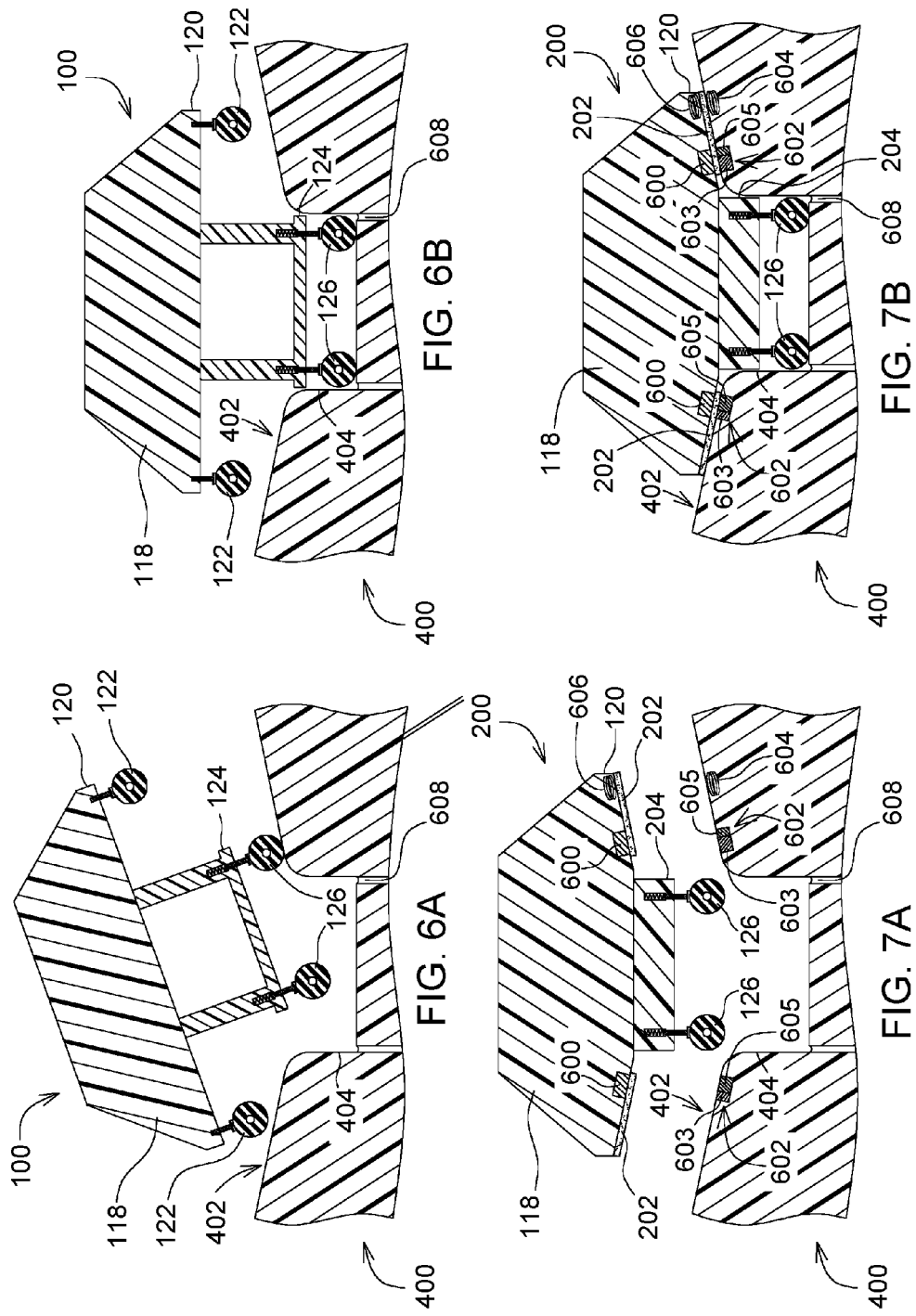

UAV DOCKING SYSTEM AND METHOD

FIELD OF THE DISCLOSURE

The present disclosure generally relates to a docking system and method, and more particularly, to a docking system and method for a UAV (unmanned aerial vehicle).

BACKGROUND

A UAV docking system may be used to aid a UAV in launching from, and landing at, a particular platform. The docking system may also secure and protect the UAV when it is not in the air.

SUMMARY

According to an aspect of the present disclosure, an aerial vehicle docking system includes a landing pad and an aerial vehicle. The landing pad has a concave landing surface which includes a depression. The aerial vehicle has landing gear and a protrusion. The protrusion is shaped to mate with the depression. The protrusion and the landing gear are positioned on a bottom surface of the aerial vehicle.

According to another aspect of the present disclosure, an aerial vehicle docking system for a work vehicle comprises an operator station, a landing pad, and an aerial vehicle. The operator station has a roof and is part of the work vehicle. The landing pad is attached to the roof and has a concave landing surface which includes a depression. The aerial vehicle has landing gear and a protrusion. The protrusion is shaped to mate with the depression. The protrusion and the landing gear are positioned on a bottom surface of the aerial vehicle.

According to another aspect of the present disclosure, a method of docking an aerial vehicle comprises positioning an aerial vehicle having landing gear and a protrusion on a bottom surface of the aerial vehicle such that at least a portion of the landing gear is above a concave landing surface including a depression, and lowering the aerial vehicle until at least a portion of the landing gear is in contact with the landing surface.

The above and other features will become apparent from the following description and accompanying drawings.

BRIEF DESCRIPTION OF THE DRAWINGS

The detailed description of the drawings refers to the accompanying figures in which:

FIG. 5A, FIG. 5B, FIG. 5C, and FIG. 5D are perspective views of a UAV touching down on, settling lower on, docking with, and taking off from a landing pad.

FIG. 6A and FIG. 6B are cross-sectional views of a UAV with wheels for landing gear and a shoulder with wheels docking with a landing pad.

FIG. 7A and FIG. 7B are cross-sectional views of a UAV with wheels for landing gear and a shoulder with skidpads docking with a landing pad.

DETAILED DESCRIPTION

Figure 1:
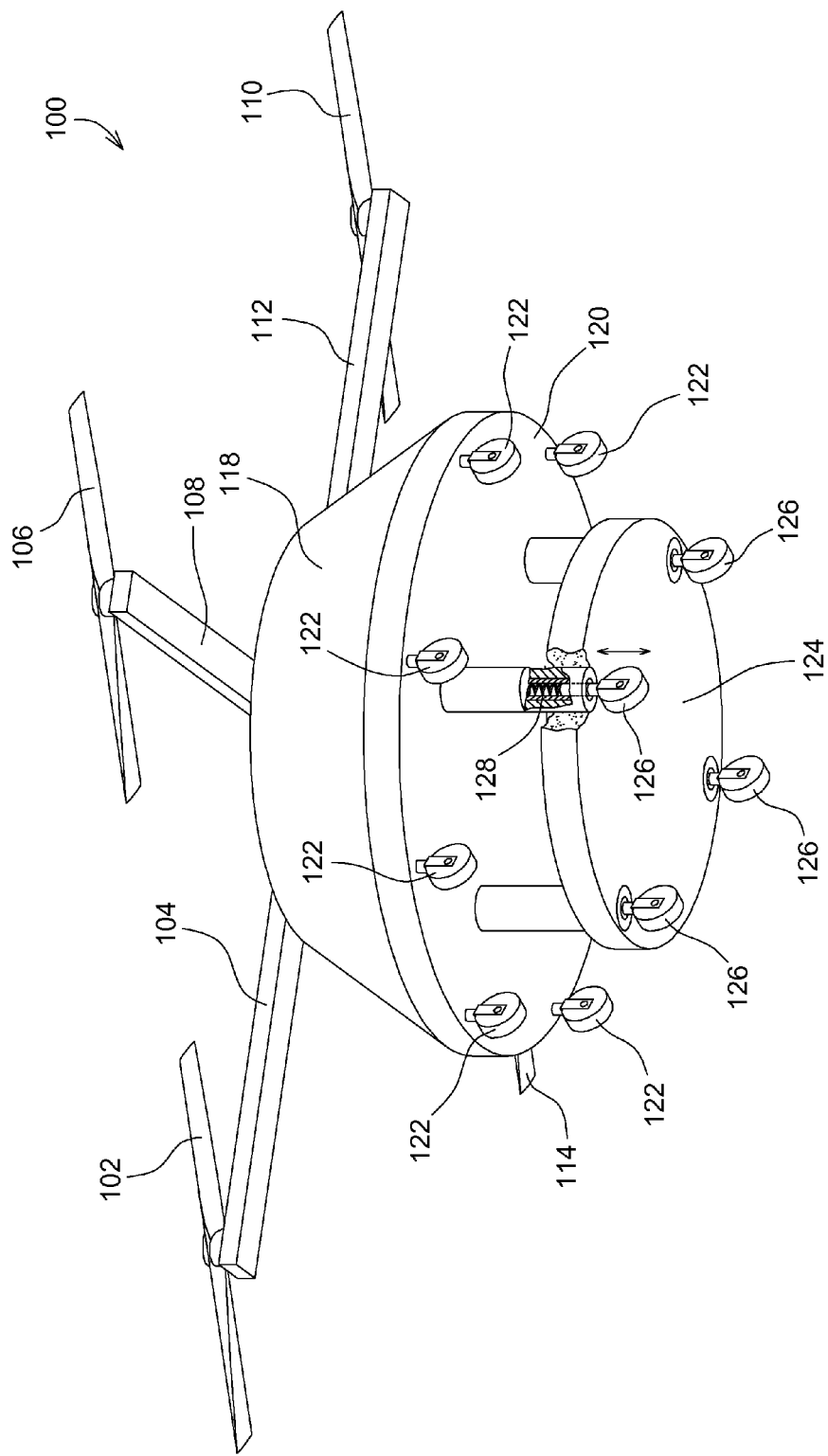
FIG. 1 is a perspective view of a UAV with wheels for landing gear and a shoulder with wheels.

FIG. 1 illustrates UAV (unmanned aerial vehicle) 100 having first rotor 102 associated with first arm 104, second rotor 106 associated with second arm 108, third rotor 110 associated with third arm 112, fourth rotor 114 associated with fourth arm 116 (not shown in FIG. 1, see FIG. 4), body 118, shoulder 120, shoulder wheels 122, protrusion 124, and protrusion wheels 126 which serve as landing gear for UAV 100. UAV 100 is a rotary-wing aircraft, and may be referred to as a quadcopter or quadrotor, but alternate embodiments may utilize different UAV designs, including other rotary-wing aircraft (e.g., helicopters, tricopters, hexacopters, and octocopters) and other aircraft with vertical take-off and landing capabilities.

First rotor 102, second rotor 106, third rotor 110, and fourth rotor 114 are each pivotally attached to first arm 104, second arm 108, third arm 112, and fourth arm 116, respectively, allowing each rotor to spin about a central pivot point. Each of first rotor 102, second rotor 106, third rotor 110, and fourth rotor 114 may be driven by a separate motor which has a shaft that is rotationally coupled to the rotor. Alternatively, a single motor may be used to drive all four rotors or one motor may drive a pair of rotors of UAV 100, through gearing, belts, chains, or another mechanism, which may also be called a transmission. The transmission may enable each of first rotor 102, second rotor 106, third rotor 110, and fourth rotor 114 to rotate at a different speed (or substantially the same speed) relative to the other rotors. The rotation of first rotor 102, second rotor 106, third rotor 110, and fourth rotor 114 provides lift for UAV 100, and rotating such rotors at different speeds enables UAV 100 to tilt and fly in a particular direction.

Each of first arm 104, second arm 108, third arm 112, and fourth arm 116 attach to body 118. For example, in one embodiment, first arm 104, second arm 108, third arm 112, and fourth arm 116 are each integrally molded with body 118. Body 118, first arm 104, second arm 108, third arm 112, and fourth arm 116 are formed of a high strength plastic, but in alternative embodiments they may be formed of other materials such as metal or a polymeric matrix filled carbon fiber. Body 118 is hollow and contains controllers, batteries, motors, gearing, and other components that allow UAV 100 to operate. The controllers included in body 118 control the flight of UAV 100, including by adjusting the rotational speed of the motors for each of first rotor 102, second rotor 106, third rotor 110, and fourth rotor 114. The controllers may also manage the battery, provide positional information such as through receivers in communication with a global navigation satellite system (GNSS), communicate with a remote location such as through a wireless communications system (e.g., cellular system, satellite system), communicate with a local base station such as through short-range radio waves, operate a payload such as a camera or delivery system, and autonomously operate UAV 100. In this embodiment, UAV 100 may be operated autonomously, semi-autonomously through occasional commands sent to UAV 100, or manually by a human operator. UAV 100 has the necessary controllers located within body 118 to operate autonomously pursuant to instructions stored and executed locally on UAV 100, but in alternative embodiments such instructions may be stored and executed remotely, such as on a server, and then simple commands may be sent to UAV 100 such as over a wireless communication system (e.g., cellular system, satellite system). UAV 100 may also be manually operated by an operator giving direct commands, such as controlling lift, direction of travel, and payload usage.

Figure 3:
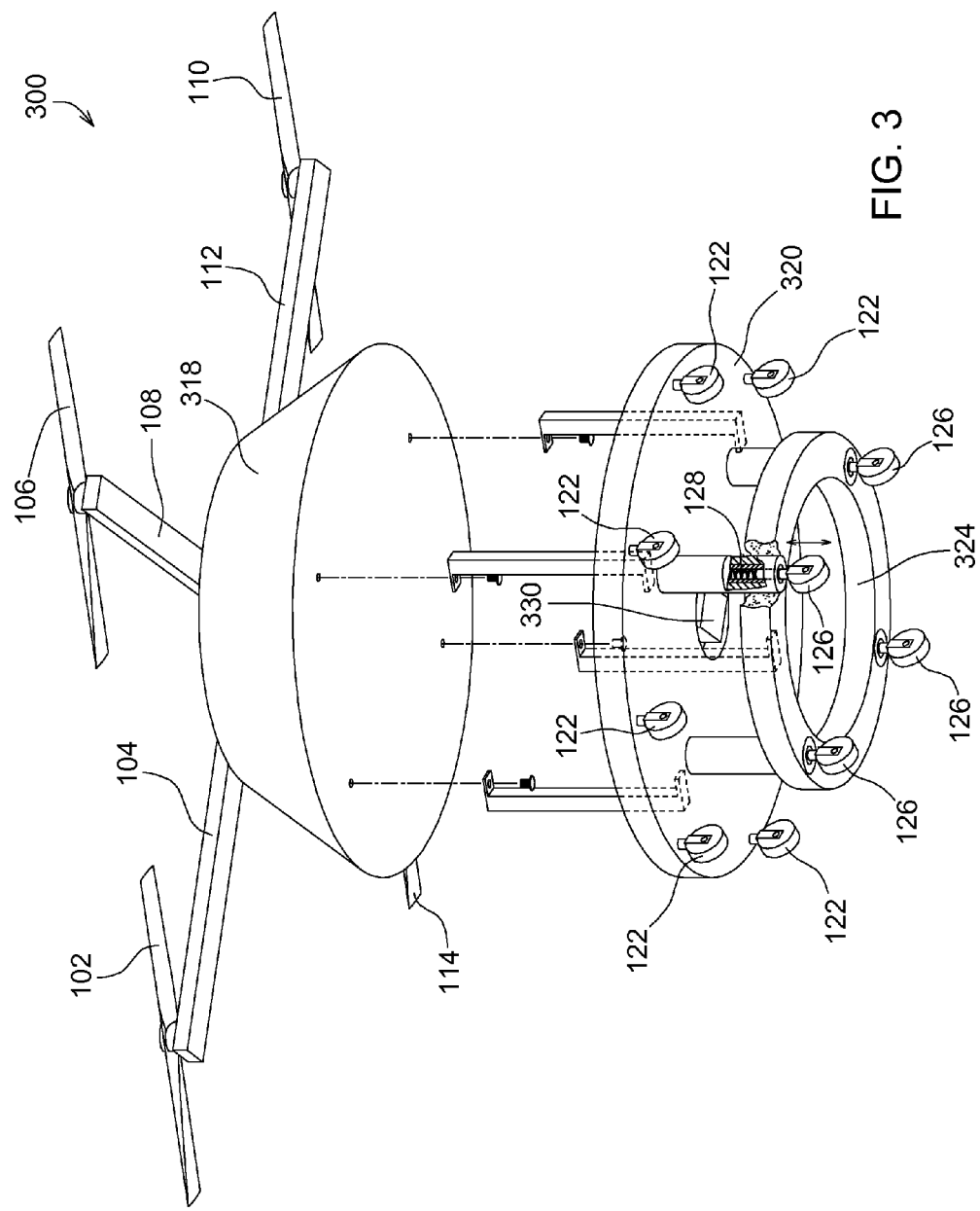
FIG. 3 is a perspective view of a UAV with wheels for landing gear and a shoulder with wheels, where the shoulder and landing gear are not integrated into a body of the UAV.

Shoulder 120 is an annular region positioned on a lower surface of body 118 and extending radially outward beyond the perimeter of protrusion 124. However, shoulder 120 and protrusion 124 lie in different planes such that they are vertically separated with respect to each other. By extending radially outward beyond the perimeter of protrusion 124, shoulder 120 and shoulder wheels 122 will tend to contact an exterior surface prior to protrusion 124 in the event that UAV 100 tips over, or is tilted at a roll, tilt, or yaw angle that exceeds a minimum threshold angle with respect to a normal line projecting upward from a surface on which UAV 100 is landing. In one embodiment, shoulder 120 is a perimeter region of body 118 which extends radially outward beyond the perimeter of protrusion 124 in every direction in a uniform annulus. In alternative embodiments, shoulder 120 may instead be a separate component which attaches to body 118 (see FIG. 3), an incomplete annulus, or it may extend beyond the perimeter of protrusion 124 in only select spots with multiple members. To have shoulder 120 extend beyond the perimeter of protrusion 124 does not require a continuous component which extends beyond the perimeter of protrusion 124 on all sides. For example, in an alternative embodiment, shoulder 120 may comprise three protrusions that extend beyond the perimeter of protrusion 124 at approximately even intervals, and which will tend to contact an exterior surface prior to protrusion 124 contacting that same exterior surface when UAV 100 tips over. In the embodiment illustrated in FIG. 1, shoulder 120 is integrally formed as part of body 118 and is therefore comprised of the same material as body 118. In alternative embodiments, shoulder 120 may be formed separately from body 118 and attached to body 118 either directly or indirectly through another component such as protrusion 124, as shown in FIG. 3.

Figure 2:
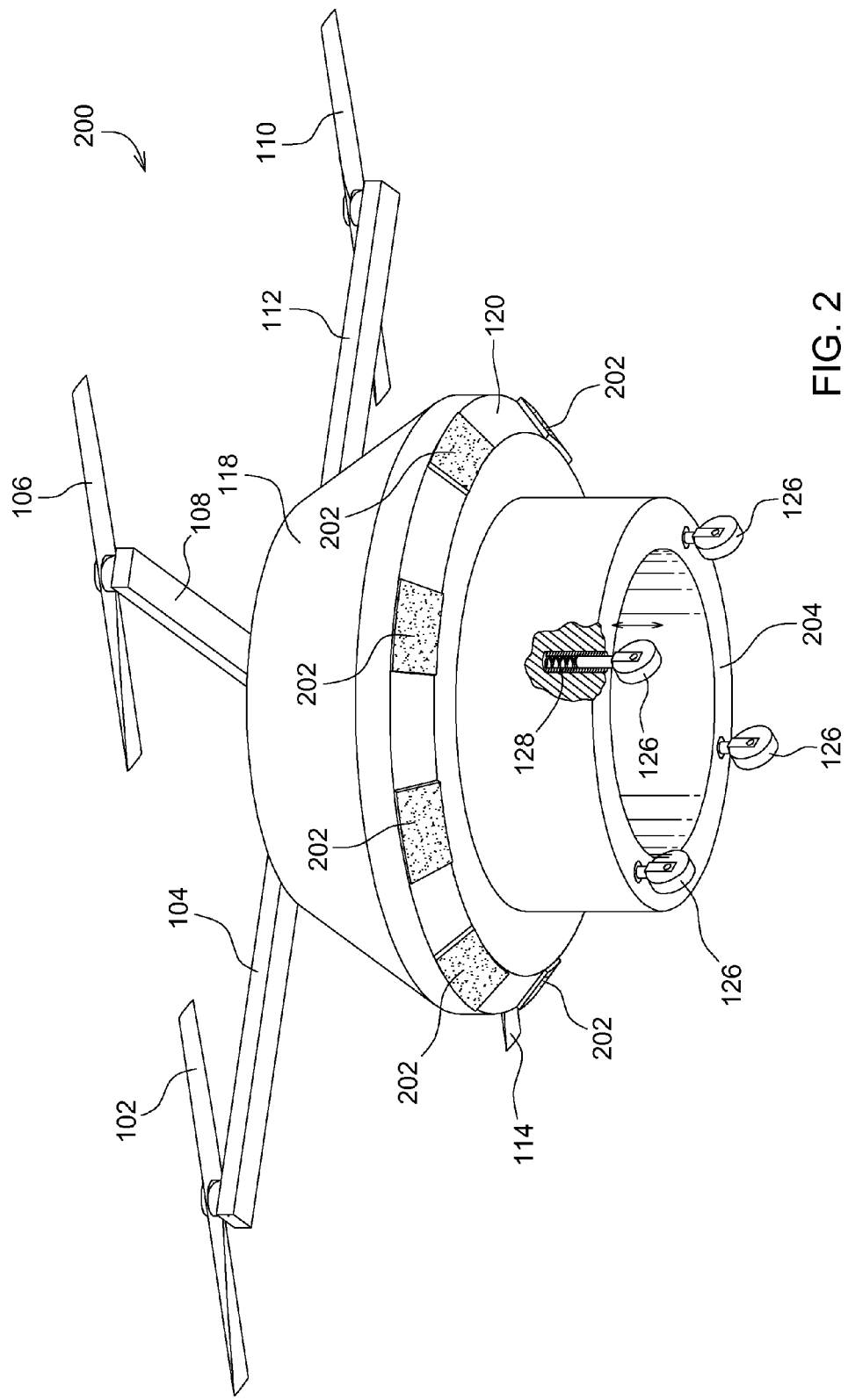
FIG. 2 is a perspective view of a UAV with wheels for landing gear and a shoulder with skidpads.

Shoulder wheels 122 attach to shoulder 120 on a bottom surface of shoulder 120 which is also a bottom surface of UAV 100. Shoulder wheels 122 attach to shoulder 120 in a ring pattern with approximately even spacing between each wheel. Each of shoulder wheels 122 is capable of rolling in any direction which, when combined with the ring pattern, allows shoulder wheels 122 to collectively provide rolling support to UAV 100 in any direction. In this embodiment, shoulder wheels 122 are swivel casters, but in alternative embodiments other components which enable low-friction relative motion between shoulder 120 and an external surface may be used, such as a skidpad or a ball caster, to name but a few such possible components. FIG. 2 illustrates an alternative embodiment with skidpads instead of swivel casters attached to shoulder 120.

Protrusion 124 is positioned below shoulder 120, and is attached to UAV 100 along a bottom surface of UAV 100. Protrusion 124 is a disc-shaped or cylinder-shaped protrusion which is attached to UAV 100 through four rigid cylinders, all of which may be hollow to reduce weight. In alternate embodiments, protrusion 124 may be attached to UAV 100 in a number of different manners, including by being integrally formed with body 118 (see FIG. 2), by being attached to UAV 100 with a suspension system allowing for movement of protrusion 124 relative to the remainder of UAV 100, or being attached to UAV 100 with a single member instead of four cylinders, to name but a few possibilities.

Protrusion wheels 126 are positioned below protrusion 124 and are attached to a bottom surface of protrusion 124 which is also a bottom surface of UAV 100. Protrusion wheels 126 are positioned below protrusion 124 in a ring pattern with approximately even spacing between each wheel. Protrusion wheels 126, like shoulder wheels 122, are swivel casters in this embodiment but may be other components which enable low-friction relative motion between protrusion 124 and an external surface. Protrusion wheels 126 are attached to protrusion 124 through suspension 128. Suspension 128 comprises a tube which receives a cylinder-shaped portion of protrusion wheels 126, with a spring within the tube which biases protrusion wheels 126 toward an extended position. Suspension 128 allows protrusion wheels 126 to compress the spring and retract when acted on by an external force, reducing shock arising from loads that are carried by protrusion wheels 126, protrusion 124, and body 118. Alternative embodiments may not include suspension 128 or any other component performing a similar function, or may include alternative suspension mechanisms.

FIG. 2 illustrates UAV 200 having the same components as UAV 100, with the exception that shoulder wheels 122 are replaced by skidpads 202 and protrusion 124 is replaced by protrusion 204. Like references in FIG. 1 and FIG. 2 indicate like elements.

Skidpads 202 are a skid surface, a low-friction surface that permits body 118 to move relative to an external surface with a low resistance force. For example, skidpads 202 may be in slidable contact with an external surface, where skidpads 202 have a low coefficient of friction with respect to the mating external surface. In this embodiment, skidpads 202 are a series of pads positioned on a bottom surface of shoulder 120 and attached to shoulder 120. In alternative embodiments, skidpads 202 may be a series of greater or fewer pads, including a single pad surrounding body 118. Skidpads 202 may be constructed of any number of low-friction materials, including polyethylene, polytetrafluoroethylene, fluorinated ethylene propylene, perfluoroalkoxy, polyoxymethylene, and nylon, to name but a few such materials. Both protrusion wheels 126 and skidpads 202 constitute landing gear for UAV 100 and UAV 200, respectively, as further described with reference to FIGS. 5A, 5B, 5C, and 5D below. Protrusion 204 is positioned on a bottom surface of UAV 200, and is integrally formed with body 118 such that it is included in a single molded piece of plastic.

Protrusion 204 is a hollow cylinder shaped region which is integrally formed on a bottom surface of UAV 200. This configuration may facilitate the placement of sensors within the hollow of protrusion 204, allowing such sensors a clear path to the ground below UAV 200 while protecting such sensors from debris coming from other directions.

FIG. 3 illustrates UAV 300 having many of the same components as UAV 100, with the exception that body 118 is replaced by body 318, shoulder 120 is replaced by shoulder 320, and protrusion 124 is replaced by protrusion 324. Like references in FIG. 1 and FIG. 3 indicate like elements. UAV 300 also has sensor 330 positioned within a depression formed in shoulder 320.

Body 318 is similar to body 118, with the exception that it is formed separately from shoulder 320 and protrusion 324. Body 318 may be a pre-existing UAV design that may be modified through the attachment of shoulder 320, protrusion 324, and components included therein. This modification may permit pre-existing UAV designs to be used with the present disclosure.

Shoulder 320 is a generally disc or cylinder shaped component which may be attached to body 318 through four legs which are fastened to body 318. Shoulder 320 may be attached to body 318 through a number of different mechanisms, including fasteners, clamps, magnets, and adhesives. Sensor 330 is positioned on a bottom surface of shoulder 320 within a depression formed in shoulder 320. This configuration allows sensor 330 a clear path below UAV 300, through the center of protrusion 324, which may be beneficial if sensor 330 is an imaging device used to image the ground beneath UAV 300. Positioning sensor 330 within a depression of shoulder 320 may provide protection to sensor 330 from debris or impacts. Shoulder wheels 122 are attached to and positioned on a bottom surface of shoulder 320, which is also a bottom surface of UAV 300.

Protrusion 324 is of a generally annular shape, and is attached to a bottom surface of shoulder 320. Protrusion wheels 126 are attached to and positioned on a bottom surface of protrusion 324 in a ring pattern. Protrusion 324 may be attached to body 318 through shoulder 320, allowing the assembly to be attached to, and removed from, different UAVs.

Figure 4:
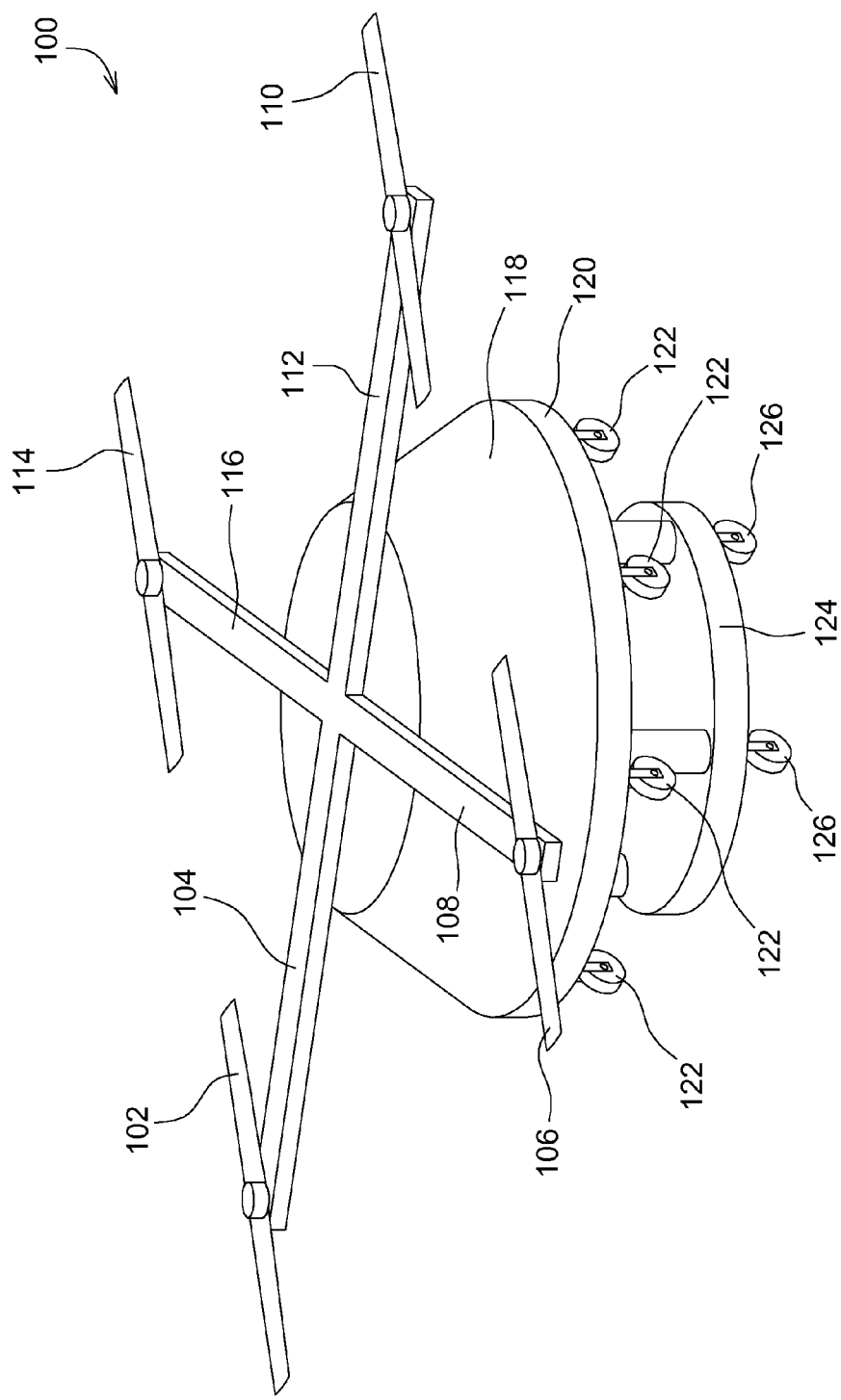
FIG. 4 is a perspective view of a UAV with wheels for landing gear and a shoulder with wheels.

FIG. 4 illustrates UAV 100 from a different perspective than FIG. 1. Specifically, this perspective allows fourth rotor 114 and fourth arm 116 to be seen.

FIG. 5A, FIG. 5B, FIG. 5C, and FIG. 5D illustrate a UAV docking system including UAV 100 and landing pad 400. Landing pad 400 includes landing surface 402 and depression 404. Landing pad 400 may be comprised of a number of different materials, may be solid or hollow, and may be integrally formed of one piece of material or formed of multiple joined pieces, depending on the embodiment. In this embodiment, landing pad 400 is comprised of a single piece of high strength plastic. Landing pad 400 is disc-shaped or cylinder-shaped, with a radius multiple times greater than its height. Landing surface 402 is positioned on top of landing pad 400, and is concave with a uniform slope in all directions such that the lowest point of landing surface 402 is located at the center of landing surface 402. Included in landing surface 402 is depression 404, which is a disc-shaped or cylinder-shaped depression positioned in the center of landing surface 402. Depression 404 is configured to mate with protrusion 124. Depression 404 is configured with the same shape as protrusion 124, a disc or cylinder shape, but with a greater radius so as to allow protrusion 124 to fit within depression 404. The radius of depression 404 is only slightly larger than the radius of protrusion 124, which allows protrusion 124 to fit within depression 404 without requiring significant downward force while also prohibiting significant movement of protrusion 124 once it is within depression 404. Depression 404 may contain a shock-absorbing material, such as an elastomeric material, which reduces the shock loads that UAV 100 may experience once protrusion 124 is mated with depression 404. Such shock loads may occur as protrusion 124 settles into depression 404, or may occur due to the movement of landing pad 400, such as if it is mounted on a moving work vehicle (see FIG. 8).

Landing surface 402 and depression 404 are integrally formed with landing pad 400 such that landing surface 402 and depression 404 are merely exposed portions of the same material which comprises landing pad 400. In alternative embodiments, landing surface 402 and depression 404 may be separate pieces which are attached to landing pad 400. Landing pad 400 is disc-shaped or cylinder-shaped, but in alternative embodiments it may be a number of different shapes including both regular shapes (e.g., square, rectangle, pentagon, hexagon) and irregular shapes. Landing surface 402 has a uniform slope downwards toward its center and depression 404, but in alternative embodiments landing surface 402 may be concave without a uniform slope. Just by way of examples, landing surface 402 may have differing slopes in each direction which all lead to depression 404, it may have a slope which curves from being flatter toward depression 404 and steeper away from depression 404 or vice versa, or it may have one slope for the portion closest to depression 404 and then a step change to a different slope at a distance away from depression 404.

FIG. 5A illustrates UAV 100 landing on landing pad 400. UAV 100 approaches landing pad 400 until at least a portion of its landing gear, protrusion wheels 126 in this embodiment, is above landing surface 402. UAV 100 may be controlled to approach landing pad 400 in a number of ways, including through manual commands issued by an operator and transmitted to UAV 100, positioning and routing based on GNSS, positioning and routing based on local relative navigation or position sensing (e.g., a base station emitting positional data from or near landing pad 400, a series of lights or patterns on landing pad 400 which UAV 100 may detect and navigate toward), or some combination of these and/or other methods. Once UAV 100 is above landing surface 402, UAV 100 may be lowered until protrusion wheels 126 contact landing surface 402, as shown in FIG. 5A. UAV 100 may lower itself by reducing the lift generated by its rotors until such lift is insufficient to overcome the weight of UAV 100.

FIG. 5B illustrates UAV 100 settling lower on landing surface 402 by gravity. Once UAV 100 has landed on landing surface 402, it may continue to lower itself by allowing gravity to roll it down concave landing surface 402 toward depression 404. Landing pad 400 allows UAV 100 to settle lower using the force of gravity without the need for additional moving components, such as mechanical levers or arms, to bring UAV 100 towards the center of landing pad 400. UAV 100 may lower itself further on landing surface 402 by maintaining the lift force it generated when landing, which was insufficient to overcome the weight of UAV 100, or by lowering the lift force even further such as by ceasing the rotation of its rotors. Depending on the design of UAV 100, including the rolling resistance of its landing gear (or sliding resistance in some alternative embodiments), the slope of landing surface 402 may be adjusted to allow UAV 100 to roll down toward depression 404, with a greater slope required for greater rolling resistance and a lesser slope required for less rolling resistance.

Shoulder 120, which may be present in some embodiments, may prevent UAV 100 from tipping over if UAV 100 is unable to touch down with its landing gear approximately centered below body 118. As UAV 100 tips, shoulder 120, which extends outward from UAV 100, may contact landing surface 402 and prevent further tipping. Depending on the size and position of shoulder 120, it may serve to prevent UAV 100 from falling off landing surface 402, protect the rotors of UAV 100 from coming into contact with landing surface 402 or some other object which may damage the rotors or the object, or it may allow UAV 100 to right itself back onto its landing gear. For some embodiments, an operator may need to intervene and manually right UAV 100 if shoulder 120 comes into contact with landing surface 402.

FIG. 5C illustrates protrusion 124 of UAV 100 mating with depression 404. As UAV 100 settles lower on landing surface 402, protrusion 124 falls into depression 404 and thereby mates with depression 404. Due to the mating configuration of protrusion 124 and depression 404, once the two have mated, UAV 100 should be stably positioned and resistant to being dislodged by vibrations or impacts to landing surface 400. At this point, UAV 100 may be powered down and secured, covered, and/or charged as described below with reference to FIG. 7A, FIG. 7B, and FIG. 9. Configuring protrusion 124 and depression 404 to mate allows UAV 100 to be secured with respect to landing pad 400 without the need for additional moving components, such as mechanical, electrical, and/or magnetic retention mechanisms, even though some embodiments may utilize such mechanisms to provide a secondary method of securing UAV 100, such as the embodiment illustrated in FIG. 7A and FIG. 7B.

FIG. 5D illustrates UAV 100 launching from landing pad 400. Protrusion 124 mates with depression 404 without imposing so much resistance as to prevent UAV 100 from launching under its own power. UAV 100 may increase its lift force until protrusion 124 disengages from depression 404, at which point UAV 100 is then free to fly a route.

FIG. 6A and FIG. 6B are cross-sectional views which illustrate how protrusion 124 of UAV 100 may mate with depression 404. As UAV 100 is lowered from its position in FIG. 6A to its position in FIG. 6B, protrusion 124 engages with depression 404. In this embodiment, the top edge of depression 404 is rounded to aid protrusion 124 in engaging with depression 404. In FIG. 6B, protrusion 124 mates with depression 404, with the landing gear of UAV 100, protrusion wheels 126, contacting the bottom of depression 404. In the embodiment illustrated in FIG. 6A and FIG. 6B, shoulder wheels 122 do not contact landing surface 402 after protrusion 124 is mated with depression 404. Shoulder wheels 122 may or may not contact landing surface 402 after docking in alternative embodiments, depending on the design of UAV 100 and landing surface 402. Once protrusion 124 is mated with depression 404, UAV 100 may be further secured, covered, or charged. Even if no further securing takes place, the mate between protrusion 124 and depression 404 should aid in keeping UAV 100 stationery relative to landing pad 400 which may be beneficial if landing pad 400 is moved, for example if landing pad 400 is dragged or rolled by wheels to a storage location (see FIG. 9), or if landing pad 400 is positioned on top of a work vehicle (see FIG. 8).

FIG. 7A and FIG. 7B are cross-sectional views which illustrate protrusion 204 of UAV 200 mating with depression 404 of landing pad 400. As UAV 200 is lowered from its position in FIG. 7A to its position in FIG. 7B, protrusion 204 engages with depression 404. When protrusion 204 of UAV 200 mates with depression 404, the landing gear of UAV 200, protrusion wheels 126, contacts the bottom of depression 404 and skidpads 202 contact landing surface 402 of landing pad 400. This embodiment may be desirable if UAV 200 may experience significant shocks, vibration, and bouncing, as it allows force to be transferred between landing pad 400 and UAV 200 through both protrusion wheels 126 and skidpads 202, and allows for a wider base of support as shoulder 120 extends radially outward past protrusion 204.

FIG. 7A and FIG. 7B illustrate an embodiment with magnet 600, magnet 602, coil 604, and coil 606. Magnet 600 and coil 604 are included within body 118 near shoulder 120. Magnet 602 and coil 606 are included within landing pad 400 near where shoulder 120 rests when protrusion 204 mates with depression 404. Magnet 600 and magnet 602 are aligned so as to overlap each other, and coil 604 and coil 606 are also aligned so as to overlap each other. Although magnet 600, magnet 602, coil 604, and coil 606 are illustrated as positioned near shoulder 120 and where shoulder 120 rests on landing pad 400 in this embodiment, they may be positioned in alternative locations in other embodiments.

Magnet 600 and magnet 602 may form a secondary method of securing UAV 200 to landing pad 400. Magnet 600 and magnet 602 may be configured so as to attract each other, thereby providing a force tending to pull UAV 200 toward landing pad 400. Such additional force may be desirable to avoid or reduce the movement of UAV 200 relative to landing pad 400. Magnet 602 may also be configured to contain both a permanent magnet 603 and an electromagnet 605. The permanent magnet portion 603 of magnet 602 may attract magnet 600, and the electromagnet portion 605, when energized, may repel magnet 600. Such a configuration may be desirable to provide a force tending to secure UAV 200 against landing pad 400 when UAV 200 is docked, but allowing such force to be reduced, eliminated, or reversed when the electromagnet portion 605 of magnet 602 is energized, thereby aiding UAV 200 in launching from landing pad 400. UAV 200 may be secured against landing pad 400 by alternate means, include mechanical latches, straps, or fasteners.

Coil 604 and coil 606 may provide power wirelessly from landing pad 400 to UAV 200. 24300 Coil 604 and coil 606 are induction coils which are inductively coupled when UAV 200 is docked to landing pad 400 (i.e., when protrusion 204 mates with depression 404). This inductive coupling allows the energizing of coil 604 to cause the energizing of coil 606, which in turn produces an electric current. This electric current may be used to charge batteries on UAV 200 that may be used to power UAV 200. Coil 604 and coil 606 may be desirable in applications where landing pad 400 may be exposed to the elements, including water, dirt, and sand, that may corrode or cause a physical connection to fail. Coil 604 and coil 606 may also be desirable in avoiding the need for an operator or a complex mechanism to insert and remove an electrical connector into UAV 200 to allow it to charge. If it would be difficult to get the rotational alignment necessary to inductively couple coil 604 and coil 606 as shown in FIG. 6B, alternative coil designs are possible which would permit UAV 200 to charge through coil 606 regardless of its rotational orientation. For example, coil 604 may be an annular design which may inductively couple with coil 606 regardless of the rotational orientation of UAV 200.

Due to the concave shape of landing surface 402, water may collect within depression 404 if landing pad 400. To avoid pooled or stagnate water within depression 404, drain holes 608 may be included in the design. Drain holes 608 are positioned on the bottom of depression 404, and are through holes which exit on a bottom surface of landing pad 400. Drain holes 608 allow water which collects on landing surface 402 and travels to depression 404 to drain to below landing pad 400, enabling depression 404 to remain free from standing or pooled water which may interfere with protrusion 124 or protrusion 204 mating with depression 404.

Figure 8:
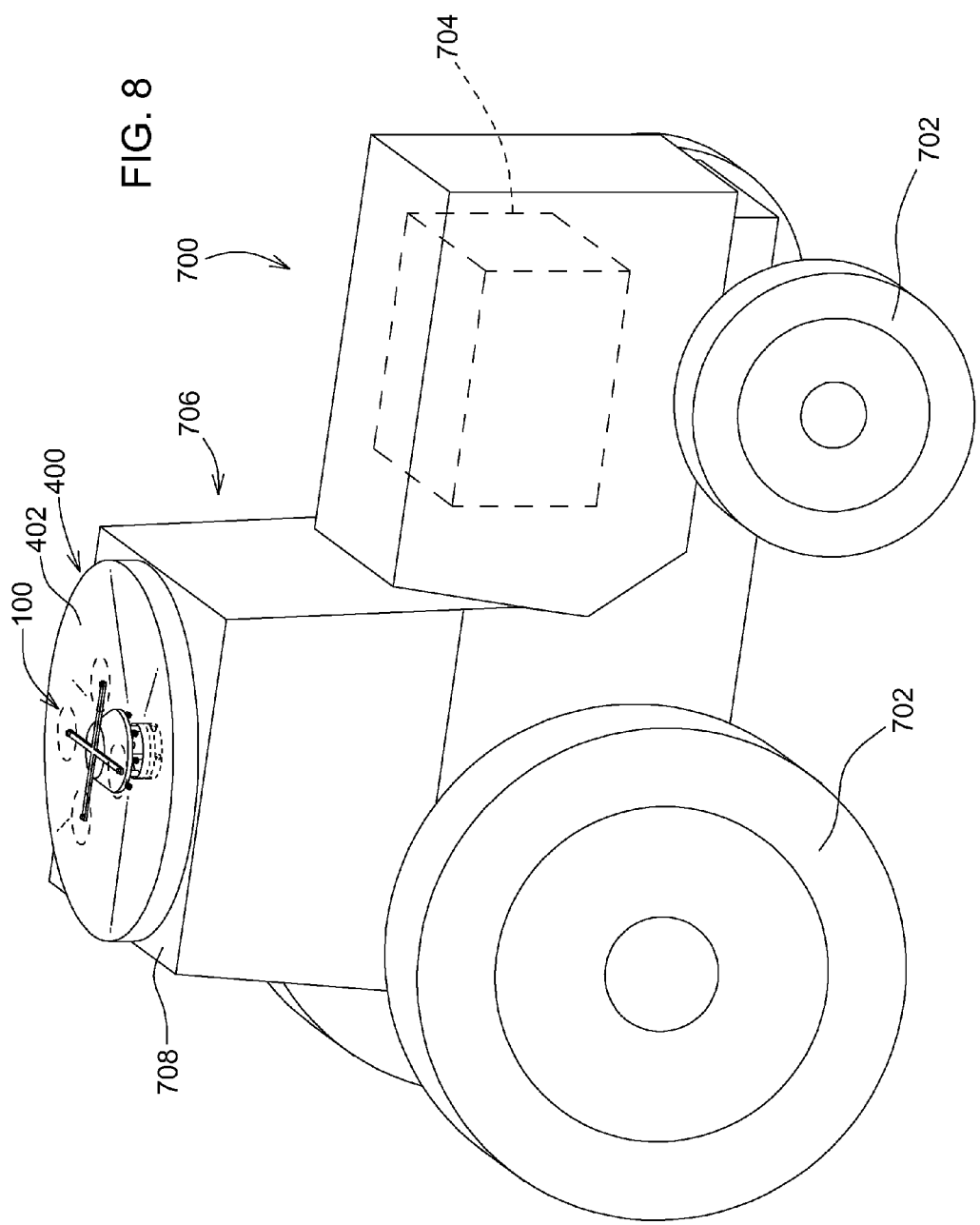
FIG. 8 is a perspective view of a UAV mated with a landing pad integrated into the roof of an operator station of a work vehicle.

FIG. 8 illustrates work vehicle 700 having tires 702, engine 704, and operator station 706 having roof 708. Work vehicle 700 is illustrated as an agricultural tractor, but may be any work vehicle with a roof, such as an articulated dump truck, backhoe loader, crawler, excavator, forwarder, harvester, haul truck, knuckleboom loader, motor grader, skid steer loader, skidder, sprayer, or wheel loader, to name a few examples. Landing pad 400 attaches to roof 708 with landing surface 402 facing upwards, providing a landing site from which UAV 100 may launch, land, and charge. Landing pad 400 may be integrally formed with roof 708 or it may constitute a separate component which is attached to roof 708, as shown in FIG. 8.

The embodiment illustrated in FIG. 8 allows UAV 100 and landing pad 400 to be transported with work vehicle 700, enabling remote operation and charging of UAV 100. This may be desirable for applications where UAV 100 is to operate at a distance from a centralized location, such as a building, but will be near work vehicle 700. For example, this may occur with agricultural fields and construction work sites. UAV 100 may launch from work vehicle 700 and fly a route, gathering information which can be sent directly to a central site or to work vehicle 700, either for upload to a central site or for use by work vehicle 700 or the operator within work vehicle 700. UAV 100 may transmit the data in any number of manners, including through the use of satellite or cellular communications networks or through shorter range wireless communications with work vehicle 700 (e.g., Bluetooth, Wi-Fi). UAV 100 may then return to work vehicle 700, such as by using GNSS to locate work vehicle 700 or by using local navigation data (e.g., a base station emitting positional data from or near landing pad 400 or work vehicle 700, a series of lights or patterns on landing pad 400 or work vehicle 700 which UAV 100 may detect and navigate toward).

Figure 9:
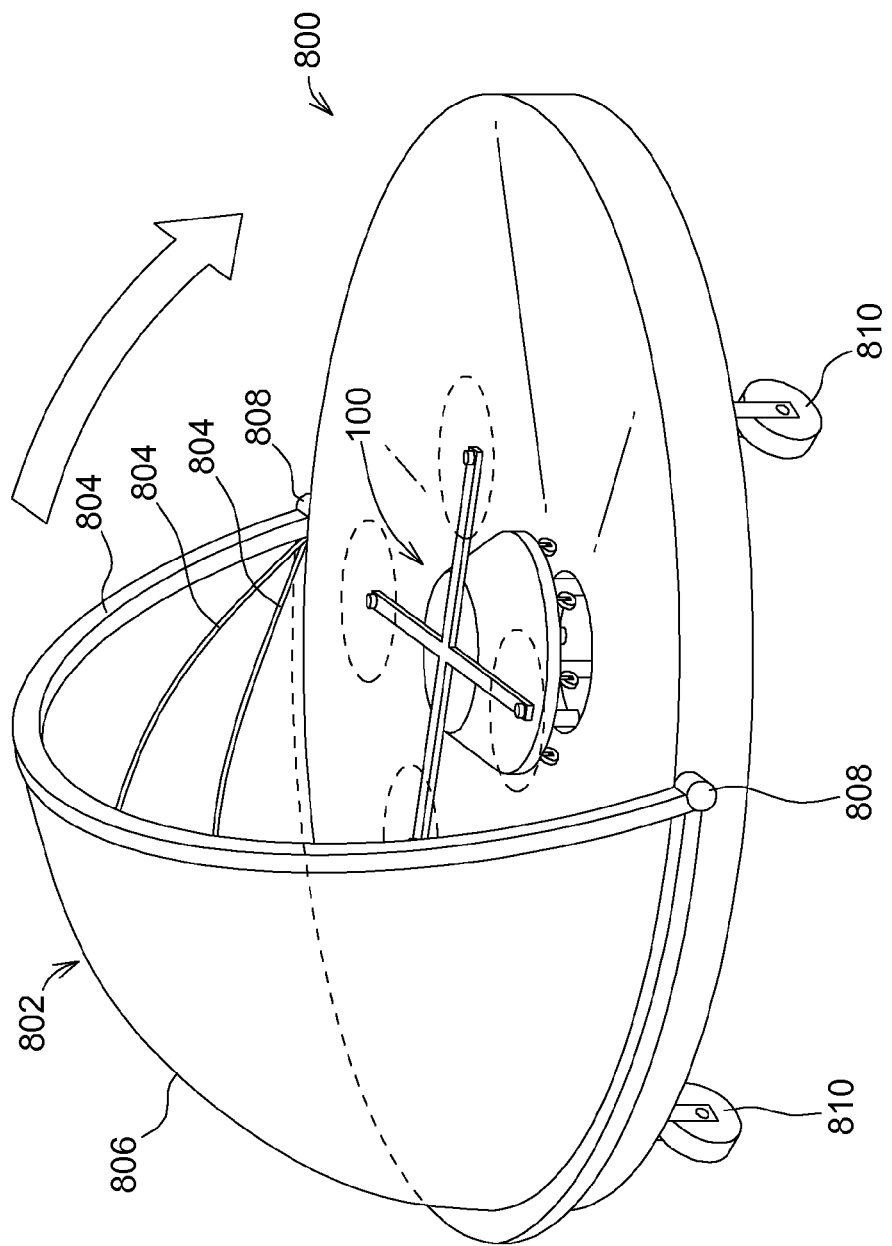
FIG. 9 is a perspective view of a landing pad with a cover.

FIG. 9 illustrates landing pad 800, which is similar to landing pad 400 except that landing pad 800 includes cover 802 and wheels 810. Cover 802 is a collapsible awning including frame 804, sheet 806, and pins 808. Frame 804 consists of a series of rigid members which are interconnected, either through direct connections to each other or through indirect connections through a common component, in this case pins 808. Sheet 806 is a fabric which is attached to frame 804 at regular intervals such that it covers frame 804 and moves with frame 804. Pins 808 are two pins pivotally connected to the remainder of landing pad 800 along a common axis that passes through the approximate middle of landing pad 800. Pins 808 allow frame 804 to rotate, which in turn allows cover 802 to move between a collapsed position and an uncollapsed position. When cover 802 is in the collapsed position, frame 804 and sheet 806 are collapsed to one side of landing pad 800 and do not cover landing pad 800, allowing UAV 100 to launch or land at landing pad 800. When cover 802 is in the uncollapsed position, frame 804 and sheet 806 are uncollapsed and spread across the area above landing pad 800, covering landing pad 800 and preventing UAV 100 from launching or landing at landing pad 800. Cover 802 may be moved between the collapsed and uncollapsed positions manually, such as by an operator pulling cover 802 open or closed, or through rotation of pins 808 such as by an electric motor which may be remotely controlled. A latch mechanism may be included in cover 802 to secure it in the collapsed or uncollapsed position, which may be beneficial if cover 802 may be subject to high winds. FIG. 9 illustrates an embodiment where cover 802 is a collapsible awning, but alternative embodiments may involve different designs for a cover which covers at least a portion of UAV 100 in a first position and which does not cover UAV 100 when in a second position.

Landing pad 800 also includes wheels 810, which facilitate the movement of landing pad 800. Such a configuration may be beneficial if landing pad 800 is stored, for example in a utility building, when not in use and is rolled between a storage location and a use location.

While the disclosure has been illustrated and described in detail in the drawings and foregoing description, such illustration and description is not restrictive in character, it being understood that illustrative embodiments have been shown and described and that all changes and modifications that come within the spirit of the disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. An aerial vehicle docking system comprising:
   a landing pad having:
      a concave landing surface comprising:
         a depression; and
   an aerial vehicle having:
      landing gear;
      a protrusion; and
      a shoulder comprising:
         at least one wheel;
      wherein the protrusion is shaped to mate with the depression when the aerial vehicle docks with the landing pad;
      wherein the protrusion and landing gear are positioned on a bottom surface of the aerial vehicle;
      wherein the shoulder extends outward beyond the perimeter of the protrusion and is positioned above at least a portion of the protrusion; and
      wherein the shoulder rests upon the concave landing surface when the protrusion is mated with the depression.

2. The docking system of claim 1, further comprising a cover attached to the landing pad, the cover movable between a first position covering at least a portion of the aerial vehicle when the protrusion is mated with the depression and a second position not covering the aerial vehicle when the protrusion is mated with the depression.

3. The docking system of claim 2, wherein the cover comprises:
   a frame,
   a sheet, and
   a pin, wherein the sheet is attached to the frame and the frame is rotatable about the pin from a first position wherein the sheet is not above the depression to a second position wherein the sheet is above the depression.

4. The docking system of claim 3, wherein the cover is a collapsible awning, the cover is collapsed in the first position, and the cover is uncollapsed in the second position.

5. The docking system of claim 1, wherein the landing gear is positioned on a bottom surface of the protrusion.

6. The docking system of claim 1, wherein the shoulder and the protrusion are elliptically shaped; and wherein a diameter of the shoulder is greater than the diameter of the protrusion.

7. The docking system of claim 1, wherein the aerial vehicle is a rotary-wing aircraft.

8. The docking system of claim 1, further comprising:
   a first magnet included in the aerial vehicle;
   a second magnet included in the landing pad, at least a portion of the first magnet overlapping at least a portion of the second magnet when the protrusion is mated with the depression.

9. The docking system of claim 8, wherein the second magnet comprises an electromagnet configured to attract or repel the first magnet in a selectable manner.

10. The docking system of claim 8, wherein the second magnet comprises a permanent magnet configured to attract the first magnet.

11. The docking system of claim 1, further comprising:
a first induction coil included in the aerial vehicle;
a second induction coil included in the landing pad, the first induction coil inductively coupled to the second inductive coil when the protrusion is mated with the depression, and wherein the first induction coil and the second induction coil are configured to transmit power from the landing pad to the aerial vehicle.

12. The docking system of claim 1, further comprising at least one wheel attached to the landing pad and configured to provide rolling support to the landing pad as the landing pad is moved.

13. An aerial vehicle docking system comprising:
a vehicle having:
an operator station in the vehicle; and
a roof;
a landing pad attached to the roof having:
a concave landing surface comprising:
a depression; and
an aerial vehicle having:
landing gear;
a protrusion; and
a shoulder comprising:
at least one wheel;
wherein the protrusion is shaped to mate with the depression when the aerial vehicle docks with the landing pad;
wherein the protrusion and landing gear are positioned on a bottom surface of the aerial vehicle;
wherein the shoulder extends outward beyond the perimeter of the protrusion and is positioned above at least a portion of the protrusion; and
wherein the shoulder rests upon the concave landing surface when the protrusion is mated with the depression.

14. The docking system of claim 13, wherein the landing surface is integrally formed as part of the roof.

15. The docking system of claim 13, wherein the vehicle is an agricultural tractor, harvester, or sprayer.

16. An aerial vehicle docking system comprising:
a landing pad having:
a concave landing surface comprising:
a depression; and
an aerial vehicle having:
landing gear;
a protrusion; and
a shoulder comprising:
at least one skid surface;
wherein the protrusion is shaped to mate with the depression when the aerial vehicle docks with the landing pad;
wherein the protrusion and landing gear are positioned on a bottom surface of the aerial vehicle;
wherein the shoulder extends outward beyond the perimeter of the protrusion and is positioned above at least a portion of the protrusion; and
wherein the shoulder rests upon the concave landing surface when the protrusion is mated with the depression.

17. The docking system of claim 16, wherein the coefficient of friction between the at least one skid surface and the landing surface is less than 0.25.

18. The aerial vehicle docking system according to claim 16 wherein the at least one skid surface comprises one or more skidpads.

19. The docking system of claim 16, further comprising:
a cover attached to the landing pad, the cover movable between a first position covering at least a portion of the aerial vehicle when the protrusion is mated with the depression and a second position not covering the aerial vehicle when the protrusion is mated with the depression.

20. The docking system of claim 19, wherein the cover comprises:
a frame;
a sheet; and
a pin; wherein the sheet is attached to the frame and the frame is rotatable about the pin from a first position wherein the sheet is not above the depression to a second position wherein the sheet is above the depression.

21. The docking system of claim 19, wherein the cover is a collapsible awning, the cover is collapsed in the first position, and the cover is uncollapsed in the second position.

* * * * *